A. ROBERTS.
REFLEX COKE OVEN.
APPLICATION FILED JUNE 22, 1916. RENEWED AUG. 10, 1918.
1,304,907.
Patented May 27, 1919.
3 SHEETS—SHEET 1.
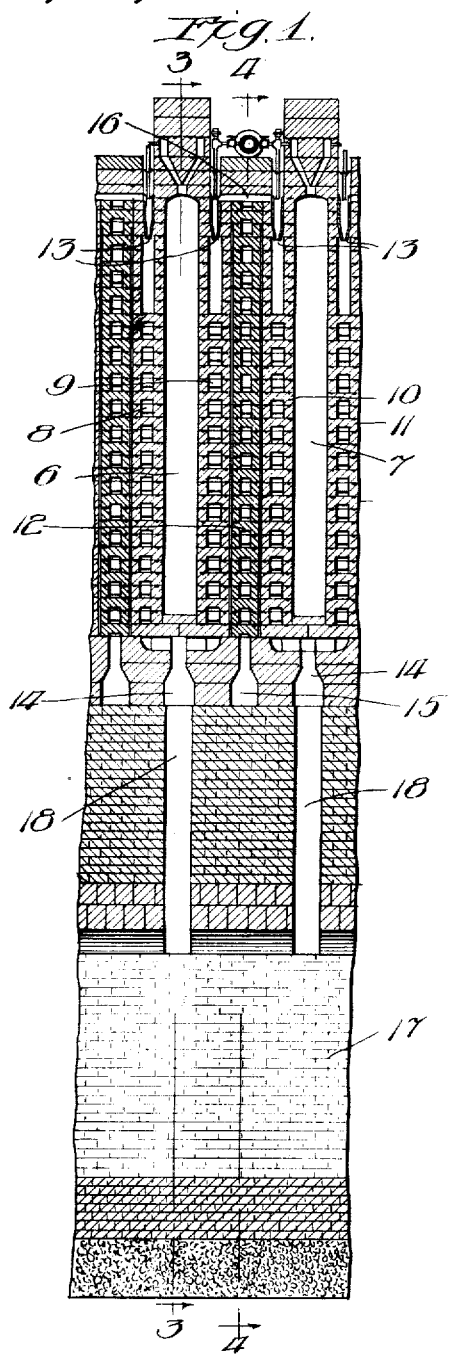
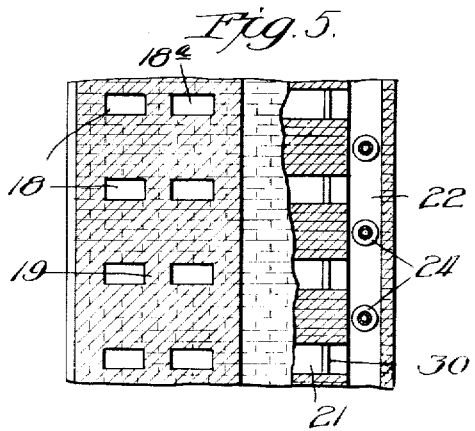
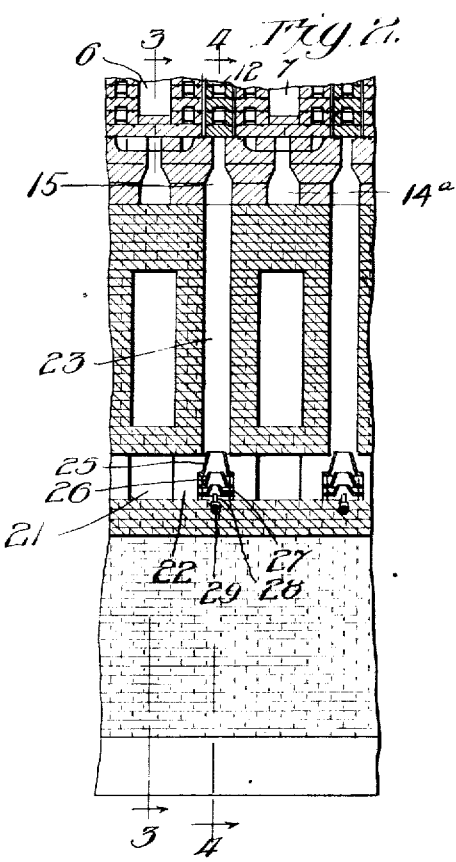

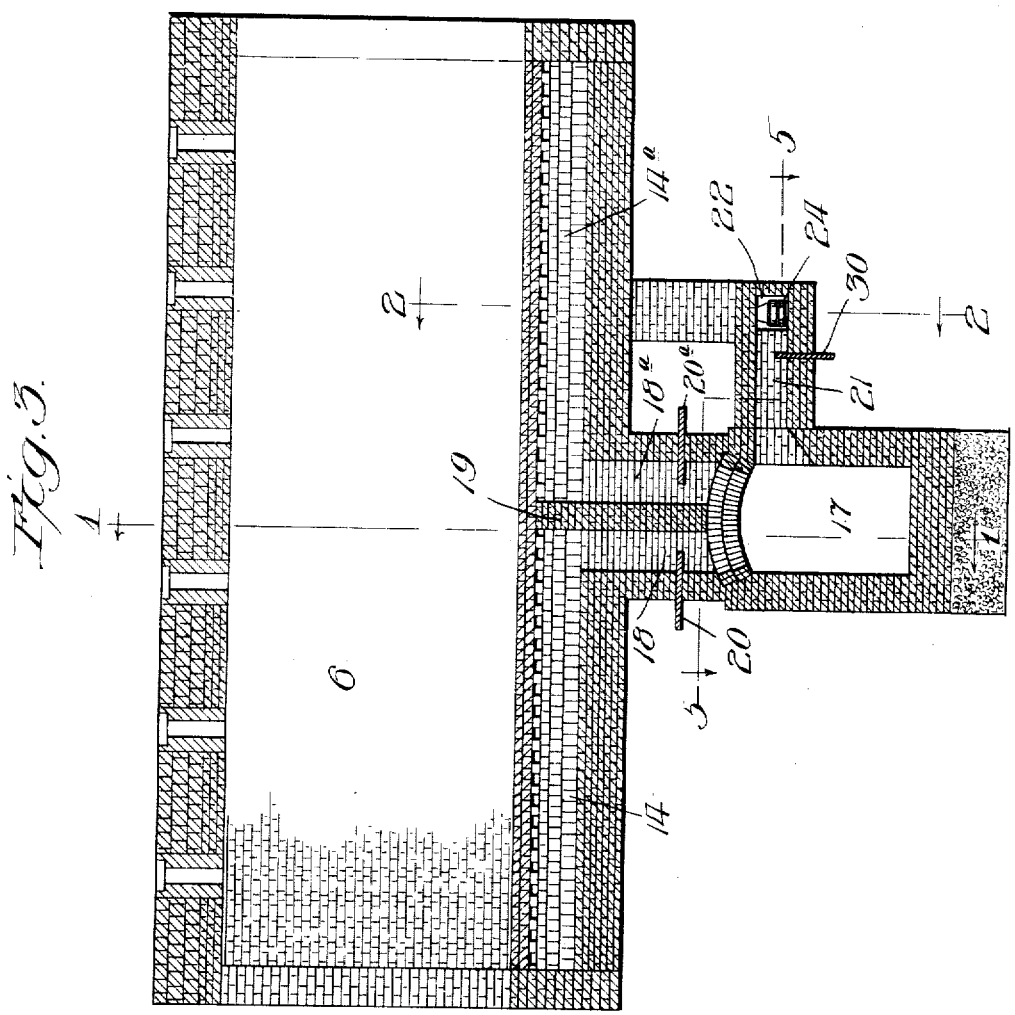

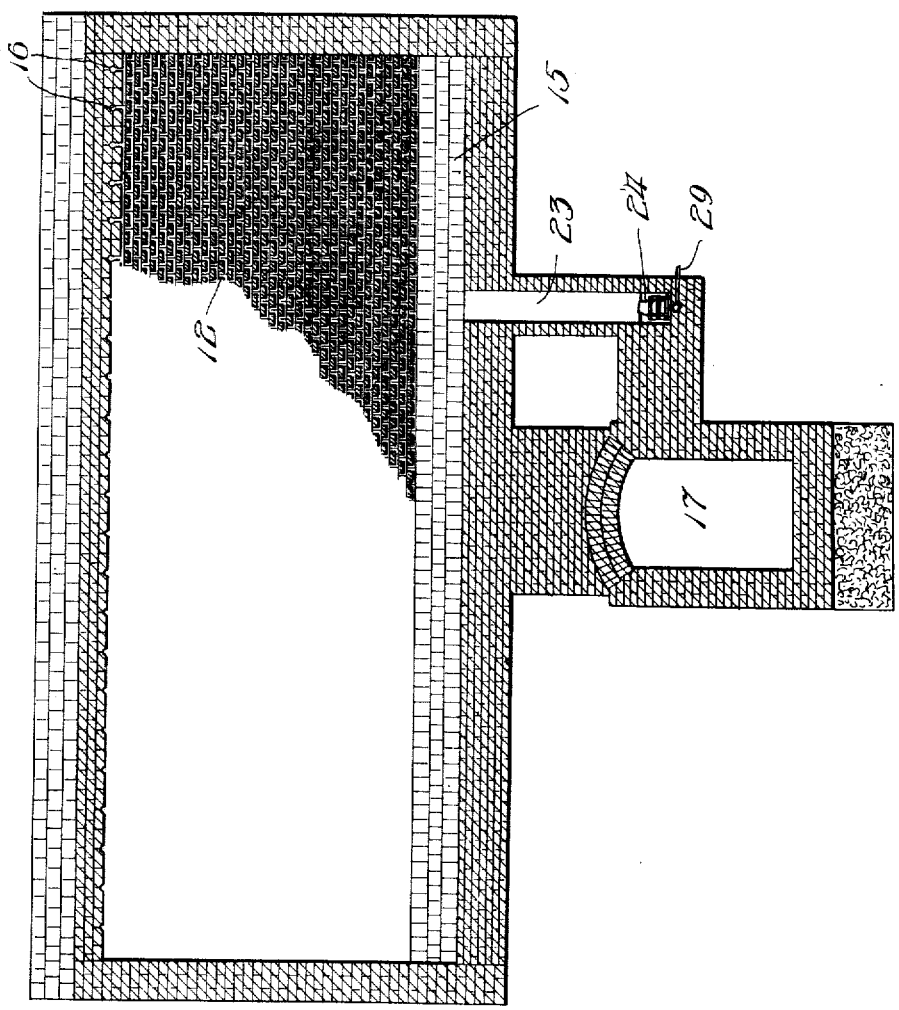

UNITED STATES PATENT OFFICE.

ARTHUR ROBERTS, OF EVANSTON, ILLINOIS.

REFLEX COKE-OVEN.

1,304,907.　　　　Specification of Letters Patent.　　Patented May 27, 1919.

Application filed June 22, 1916, Serial No. 105,131. Renewed August 10, 1918. Serial No. 249,328.

*To all whom it may concern:*

Be it known that I, ARTHUR ROBERTS, a citizen of the United States, residing at Evanston, in the county of Cook and State of Illinois, have invented certain new and useful Improvements in Reflex Coke-Ovens, of which the following is a specification.

The present invention has to do with improvements in a type of coke oven which I shall designate a reflex oven. The oven herein disclosed is so constructed that the incoming air for combustion is preheated by the waste heat of the spent gases by what I shall designate a reflex action, so that the oven is in effect a preheating coke oven.

In previous constructions of preheating coke ovens, it has been customary to preheat the air for combustion by either the regenerating or recuperating principle. In the regenerating principle the spent gases are caused to traverse a suitably constructed heat absorbing structure for the desired length of time, so that said heat absorbing structure has its temperature raised by the absorption of waste heat. On the other half of the cycle, the fresh air for combustion is caused to traverse the structure so preheated, the said fresh air being thereby preheated by the abstraction of heat from the heat absorbing structure.

In the ovens operating on the recuperating principle, the incoming fresh air is caused to continuously traverse a suitable structure, the interior portion of which structure is maintained in hot condition by the transfer of heat by conduction. When using this principle, the fresh air and heating gases always traverse their respective passages, and the transfer of heat is effected by conduction from the hot gases through the separating partition to the fresh air.

The reflex principle to which the present invention relates embodies the idea of mixing hot gases with the fresh air, so that a mixture is produced, including a proportion of oxygen depending upon the proportions in which the air and gas are mixed. Furthermore, the temperature of the mixture will depend upon the relative temperatures of the gas and air, and the proportions in which they are mixed, as well as their specific heats. By the use of this principle, any desired amount of preheating may be secured, and any desired richness or leanness of oxygen in the mixture may be secured, or these factors may be varied from time to time according to the wishes of the operator, simply by varying the proportions of the mixture. In this way a very accurate and perfect control of operation may be secured, so that the operation of the burners and the temperature of the heating walls can be very nicely adjusted in an extremely simple manner.

Ordinarily only a portion of the total amount of spent gases will be mixed with the incoming fresh air, the remaining portion of the said spent gases being allowed to pass to the flue or other point of discharge. Thus, the total amount of gas and air in the system will remain constant, the rate of delivery to the stack or other discharge mechanism eventually becoming equal to the rate of generation of spent gases depending upon the operation of the burners.

While I have hereinbefore referred to the application of this reflex preheating principle as being applied to use in connection with coke ovens, and while I shall hereafter refer to the same and shall describe the same as being used in connection with coke ovens, still it will be understood that the principles of preheating herein disclosed may be used with equal advantage in many other structures than coke ovens, and it will be understood that I do not limit myself to the application of these principles in coke oven practice, except as I may do so in the claims.

Another feature of the present invention has to do with the manner in which the spent gases are collected from the various ovens of a bench. It is quite necessary in structures of this kind to make provision for the collection of the spent gases into a tunnel or flue by which the said gases are delivered to the stack or other point of delivery. The said tunnel or tunnels extend lengthwise of the bench, and the heating walls of each oven lie across the bench. Consequently during the preliminary heating of the ovens, and during any subsequent changes of temperature in the heating walls, the expansion and contraction of the end portions of said walls takes place in a direction toward and from the center line of the ovens. Inasmuch as the spent gas tunnels are permanently fixed in the foundation, it follows that the said tunnels cannot shift back and forth across the bench of the ovens, but must maintain a fixed position in the foundation. It is, therefore, very desirable to be able to establish the connections for the delivery of spent gases from the heating walls to the tunnels in such a manner and at such a point that there will be no relative movement at the point of said connection. Therefore, another object of the invention is to so relate the spent gas tunnel or tunnels to the bench of ovens that the aforesaid connections will be established in such a way that there will be no relative movement at the point of the said connections during expansion and contraction of the heating walls.

In the drawings:

Figure 1 shows a vertical cross section through a pair of ovens with their heating walls, and through the spent gas tunnel and foundation, the said section being taken on the line 1—1 of Fig. 3, looking in the direction of the arrows;

Fig. 2 shows another section similar to that shown in Fig. 1, with the exception that Fig. 2 is taken on the line 2—2 of Fig. 3, looking in the direction of the arrows;

Fig. 3 is a vertical longitudinal section through the carbonizing chamber of one oven and through the spent gas tunnel and foundation, being a section taken on the lines 3—3 of Figs. 1 and 2, looking in the direction of the arrows in said figures;

Fig. 4 is a longitudinal cross section similar to that of Fig. 3, with the exception that it is taken on the line 4—4 of Figs. 1 and 2, looking in the direction of the arrows, being a section through the reflex mechanism and through the recuperating walls when the same are to be used; and Fig. 5 is a horizontal section taken on the line 5—5 of Fig. 3, looking in the direction of the arrows.

In the particular construction illustrated in the drawings, I have shown the features of my invention as being embodied within a bench of coke ovens, wherein the heating walls are constructed according to the principles disclosed in Letters Patent of the United States No. 1,132,685, issued to me March 23, 1915. That is to say, I have shown the features of this invention as being applied to a bench of coke ovens in which the heating walls are built up from notched blocks so arranged as to provide a meshwork of impingement passages within each heating wall. It will be understood that the features of the present invention are in no wise limited to use in connection with heating walls so constructed.

I have also shown the features of the present invention as being embodied within a bench of coke ovens wherein the air which has been heated according to the reflex principle is afterward transferred upwardly to the burners through recuperating walls, whose function is, among other things, to maintain the temperature of the said air at the desired high point until the burners are reached. Such a construction is shown, for example, in my co-pending application for Letters Patent of the United States on improvements in recuperative coke ovens, Serial No. 875,503, filed December 4, 1914. I desire to state that the features of the present invention are in no wise limited to use in connection with recuperating walls between the heating walls of the consecutive ovens, inasmuch as any suitable form of flue or passageway may be used for transferring the air, heated according to the reflex principle, to the burners.

Bearing the foregoing facts in mind, in Figs. 1 and 2, I have shown a fragmentary portion of a bench of ovens, including the carbonizing chambers 6 and 7. The chamber 6 has the heating walls 8 and 9, and the chamber 7 has the heating walls 10 and 11. Between the heating walls 9 and 10 is the recuperating wall previously referred to. Each of the heating walls is shown as being built up from a series of notched blocks. The heating gases are delivered to each heating wall by a series of burners 13, and the spent gases from the heating walls of each oven are collected eventually in a sole passage 14 lying beneath the sole of the oven. Each of the recuperating walls 12 is also shown as being built up from a series of notched blocks. The fresh air for the said recuperating wall is delivered to the said wall by an air channel 15 extending along its lower portion, and the said fresh air is delivered from the recuperating wall to the burners previously described by means of the connections 16 at the upper end of the structure. It, therefore, appears that the recuperating walls serve chiefly as a convenient structure for transferring the air upwardly from the lower portion of the bench to the burners which are at the upper portion of the bench.

The tunnel 17 extends lengthwise of the bench, collecting the spent gases to the stack, fan, or other structure desired. Referring to Figs. 3 and 4, it will be quite evident that the expansion of the heating walls with their sole passages 14 is lengthwise of the oven—that is, across the width of the bench. Consequently, the end portions of the said walls are subjected to the maximum amount of movement during expansion and contraction, whereas the central portions of the walls remain substantially stationary at all times. Inasmuch as the tunnel 17 also remains stationary, being a fixed portion of the foundation, it will appear that it is desirable to effect the connections from the sole passages 14 to the said tunnel in such a manner that the said connections will be taken from the sole passages at a point where they have the minimum amount of movement during the expansion and contraction.

I have, therefore, illustrated the tunnel 17 as lying beneath the central portion of the bench of ovens, and I have shown the downwardly extending connections 18 from the sole passages 14 to the said tunnel as being effected at the central portions of the sole passages. A partition 19 conveniently separates each connection 18 into two parts numbered 18 and 18$^a$, and the said partition is conveniently extended upwardly far enough to divide the sole passage into two parts numbered 14 and 14$^a$. The dampers 20 and 20$^a$ work in the connections 18 and 18$^a$ and serve to regulate the draft on each of said connections.

It will be quite evident that with the arrangement thus far described, any expansion and contraction in the heating walls will take place at points other than the point of connection from the sole passages to the spent gas tunnel, and consequently the said connections will not be in any manner injured or disrupted from such expansion and contraction.

Referring particularly to Fig. 3, there will be observed a sidewise connection 21, the inner end of which is connected into the upper portion of the tunnel 17. This sidewise connection 21, in turn, leads to a short horizontal connection 22, which, in turn, communicates with a vertical riser 23, the uper end of which connects to the corresponding air channel 15. Consequently, there is thus effected a direct connection from the spent gas tunnel to each air channel. Located at a convenient point in said connection is an induction device 24, the function of which is to discharge fresh air into the connection 23 in such a manner that the said fresh air will be carried upwardly into the air channel. At the same time the fresh air so introduced through the induction device will serve to carry with it by an injector action the desired amount of spent gas from the tunnel 17.

A convenient form of induction device is that shown in Figs. 2 and 3, wherein the said device is seen to comprise a series of separated hoods 25, 26, and 27 in combination with an air jet 28. The air jet receives its air under compression from a pipe 29. Each of these inductor devices is conveniently located at the lower end of the corresponding riser 23, so that the air will be thrown directly up into said riser, mixing as it rises with the spent gas which is drawn through the connections 22. Therefore, when the mixture finally reaches the air channel 15, it will be thoroughly mixed, and will have a temperature depending upon the relative proportions of air and spent gas, the relative initial temperature of these constituents, and their specific heats.

As a convenient form of construction, the several connections 22 may be joined together, so that they constitute in effect a continuous passage extending lengthwise of the bench of ovens lying parallel to the tunnel 17. Consequently, there may be a free interchange of spent gas through the said connection, thus tending to equalize the operation at all points within the bench. If desired, a damper 30 may be mounted in each of the connections 21 or at any other suitable point or points for the purpose of controlling or regulating the flow of spent gas to the induction devices.

In my co-pending application for Letters Patent of the United States on improvements in methods of preheating, Serial No. 120,349, I have disclosed certain constructions similar to those disclosed in this present case. The claims in this present application are directed to certain features of construction and combinations of parts, whereas the claims in the said co-pending application are directed to certain methods of preheating, some of which are disclosed in this present case.

While I have herein shown and described only a single embodiment of the features of my invention, still it will be understood that I do not limit myself to the said embodiment except as I may do so in the claims.

I claim:

1. In a bench of coke ovens having heating walls and burners, the combination with the heating walls, of a tunnel extending longitudinally of the bench beneath its central portion, connections for the delivery of spent gas from the heating walls to the said tunnel, connections from the said tunnel to the burners of each heating wall, and means for inducting air into each of the last mentioned connections.

2. In a bench of coke ovens having heating walls and burners, the combination with the heating walls, of a tunnel, a connection from each heating wall to the said tunnel for the delivery of spent gas thereto, a connection from the said tunnel to the burners of each heating wall, and means for inducting the air into each of the last mentioned connections.

3. In a bench of coke ovens having heating walls and burners, the combination therewith of means for delivering air to the burners, and means for delivering from the heating walls to the air delivering means, hot spent gas directly and without the interposition of regenerators, to thereby preheat the air by the use of a minimum amount of said spent gas.

4. In a bench of coke ovens having heating walls and burners, the combination therewith of a connection for the delivery of air to the burners of each heating wall, and means for delivering from the heating walls to each air connection, hot spent gas directly and without the interposition of regenerators, to thereby preheat the air by the use of a minimum amount of said spent gas.

5. The combination with a coke oven having heating walls and burners, of a connection for the delivery of air to the burners, and a connection for delivering from the heating walls to the said air connection, hot spent gas directly and without the interposition of regenerators, to thereby preheat the air by the use of a minimum amount of said spent gas.

6. The combination with a coke oven having heating walls and burners, of means for effecting a mixture of air and hot spent gas coming from the heating walls without the interposition of regenerators, to thereby preheat the air with a minimum amount of said spent gas, and means for delivering said mixture to the burners.

7. The combination with a coke oven having heating walls and burners of means for delivering air to the burners, and means for introducing into said air spent gas coming directly from the heating walls substantially at the temperature at which it leaves the said heating walls, and without the interposition of regenerators, to thereby preheat the said air.

8. The combination with a coke oven having heating walls and burners of means for delivering air to the burners, and means for introducing into said air spent gas coming directly from the heating walls substantially at the temperature at which it leaves the said heating walls to thereby preheat the said air.

9. The combination with a coke oven having heating walls and burners of means for delivering air to the burners, and means for preheating the said air by introduction thereinto of spent gas from the heating walls at substantially the temperature at which the said spent gas leaves the heating walls.

10. The combination with a coke oven having heating walls and burners of means for delivering a constituent gas to the burners and means for introducing into the said constituent gas spent gas coming directly from the heating walls substantially at the temperature at which it leaves said heating walls to thereby preheat the said constituent gas.

11. The combination with a coke oven having heating walls and burners of means for delivering a constituent gas to the burners and means for preheating the said constituent gas by introduction thereunto of spent gas from the heating walls at substantially the temperature at which the said spent gas leaves the heating walls.

12. The combination with a coke oven having heating walls and burners of means for delivering to the burners a mixture of a constituent gas and spent gas coming directly from the heating walls at substantially the temperature at which the said spent gas leaves the heating walls, whereby the said mixture is preheated by use of a minimum amount of spent gas.

13. The combination with a coke oven having heating walls and burners of means for preheating a constituent gas for the burners comprising suitable connections for leading spent gas from the heating walls to the constituent gas at substantially the temperature at which the spent gas leaves the heating walls.

14. The combination with a coke oven having heating walls and burners of means for delivering a constituent gas to the burners, and means for returning a portion of the heat of the spent gases coming from the heating walls to the burners, comprising means for mixing a portion of the spent gas having substantially its full heat, with the said constituent gas, and means for delivering the said mixture to the burners.

15. The combination with a coke oven having heating walls and burners of means for delivering a constituent gas to the burners, and means for returning substantially the full heat of a portion of the spent gas to the burners.

16. The combination with a coke oven having heating walls and burners of means for delivering a constituent gas to the burners, and means for returning a portion of the spent gas containing substantially its full heat, to the burners.

ARTHUR ROBERTS.

Witnesses:
Thomas A. Banning, Jr.,
Frances M. Frost.